United States Patent [19]
Walker et al.

[11] 3,801,442
[45] Apr. 2, 1974

[54] MULTIPLE STANDPIPE-CONTROLLED CORE HOLD DOWN MECHANISMS FOR FLUID-COOLED NUCLEAR REACTORS

[75] Inventors: Alexander Walker; Michael Roger Williams, both of Whetstone, England

[73] Assignee: British Nuclear Design & Construction Limited, Whetstone, England

[22] Filed: Mar. 24, 1969

[21] Appl. No.: 809,640

[30] Foreign Application Priority Data
Apr. 8, 1968   Great Britain.................. 16,794/68

[52] U.S. Cl.................... 176/29, 176/30, 176/78, 176/84, 176/85, 176/87
[51] Int. Cl............................ G21c 19/10, G21c 3/30
[58] Field of Search.................. 176/84, 37, 35, 43, 176/78, 30, 31, 87, 29, 85

[56] References Cited
UNITED STATES PATENTS

| 3,115,448 | 12/1963 | Hackney et al.............. 176/85 |
| 3,149,048 | 9/1964 | Bevilacquaa.................. 176/35 X |
| 3,448,006 | 6/1969 | Fortescue et al............. 176/36 R |
| 3,551,289 | 12/1970 | Eich et al...................... 176/36 X |
| 3,576,717 | 4/1971 | Thorp........................... 176/35 |
| 3,163,585 | 12/1964 | Metcalfe et al................ 176/30 X |
| 3,180,801 | 4/1965 | Rickert et al................. 176/31 X |
| 3,207,670 | 9/1965 | Fortescue et al.............. 176/37 |
| 3,238,109 | 3/1966 | Kent et al..................... 176/78 |
| 3,356,582 | 12/1967 | Saunders....................... 176/54 X |
| 3,393,128 | 7/1968 | Obertelli et al................ 176/61 X |
| 3,425,905 | 2/1969 | Greenhalgh et al............ 176/50 |

FOREIGN PATENTS OR APPLICATIONS
965,977   8/1964   Great Britain........................ 176/30

*Primary Examiner*—Benjamin R. Padgett
*Assistant Examiner*—Roger S. Gaither
*Attorney*—Stevens, Davis, Miller & Mosher

[57] ABSTRACT

In a nuclear reactor core each column 1 is maintained in a located position by an upper and lower support member 3 and 4 respectively, clearances 7 being provided between the columns to cater for bowing thereof under irradiation conditions. The upper member 3 may be released from its column so that said column may be withdrawn from the reactor pressure vessel 2. Groups of columns 1 may have their upper support members 3 connected to a standpipe closure plug so that when the latter is withdrawn from its standpipe 5 the group of columns 1 is released. Preferably the dimensions of the columns 1 are such that any bowing occurring under irradiation conditions is accommodated by the clearances 7.

1 Claim, 2 Drawing Figures

FIG.1

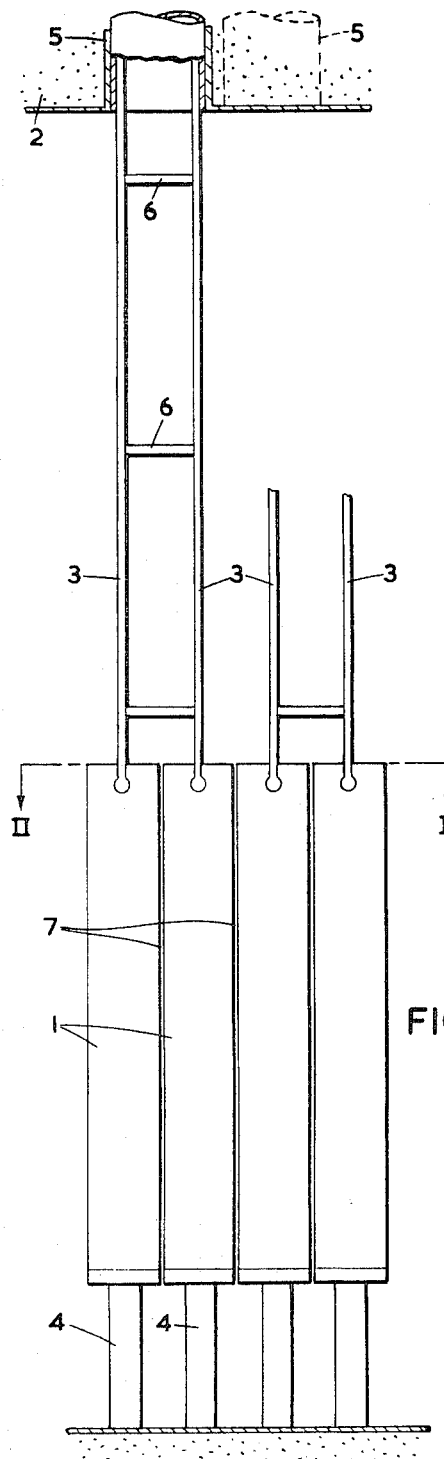
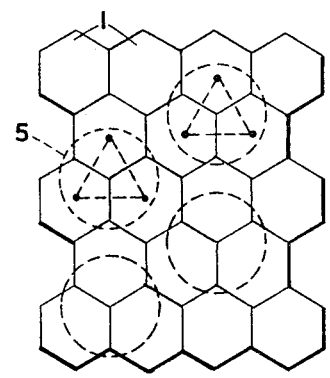
FIG.1
FIG.2
INVENTORS
ALEXANDER WALKER,
MICHAEL ROGER LLOYD WILLIAMS
BY
*Stevens, Davis, Miller & Mosher*
ATTORNEYS

MULTIPLE STANDPIPE-CONTROLLED CORE HOLD DOWN MECHANISMS FOR FLUID-COOLED NUCLEAR REACTORS

This invention relates to fluid-cooled nuclear reactors of the kind having a solid moderator core which is enclosed within a pressure vessel, said core being in the form of parallel columns.

According to this invention, in a fluid-cooled nuclear reactor of the kind having a solid moderator core which is enclosed within a pressure vessel, said core being in the form of parallel columns, each said column is maintained in a located position in the core by a pair of support members, there being clearances left between said columns to cater for any bowing which might occur under irradiation conditions, one of said members extending from the top of the pressure vessel to engage with the upper end of the column, and the other support member extending from the bottom of the pressure vessel to engage with the lower end of the column, said pair of support members being coaxial, and one of the members being releasable from its respective column whereby the column is left free to be removed from the core, and replaced, via a standpipe extending through the pressure vessel wall.

Preferably, the dimensions of the columns are chosen such that any bowing which might occur under irradiation conditions can be accommodated by the clearances.

Conveniently, the upper support members of the pairs are releasable from their columns and these upper support members are arranged in groups, each group of members being carried by a common link member whereby a group of columns may be released in a single operation.

The common link member may comprise a standpipe closure member.

Those columns having fuel element channels extending therethrough may each have a single channel which supports a number of rod-like fuel pins, at spaced positions. Alternatively, each of these columns may be provided with a plurality of spaced vertical passages, each supporting a single rod-like fuel pin.

In order that the invention may be readily understood, a nuclear reactor constructed in accordance therewith will now be described, by way of example, with reference to the accompanying drawing, in which:

FIG. 1 is a fragmentary diagrammatic elevation through the reactor core and pressure vessel, and FIG. 2 is a view on the line II—II of FIG. 1.

Referring to the drawings, the reactor core is built up from a plurality of parallel vertical graphite columns 1, at least some of which contain fuel element channels (not shown) in which the fuel is supported.

The columns are located within the reactor pressure vessel 2 in a required lattice formation, in this case a triangular lattice, and clearances 7 are provided between the columns to cater for any bowing of the columns which might occur under irradiation conditions. The limits of these clearances are determined by the volume of moderator to fuel ratio required for any particular design.

The length and diameter of each column 1 are chosen such that any bowing which can occur under irradiation conditions can be accommodated by the clearances 7. The columns 1 will therefore be somewhat shorter and of increased diameter for a given rated output from the reactor than has been normal practice in the past.

In accordance with the invention, the columns 1 are maintained in their located positions by upper and lower support members 3 and 4 respectively.

The support members 4 are in the form of vertical columns provided one for each core column 1, and the support columns 4 are mounted on the bottom of the pressure vessel 2 and spaced on the latter at positions corresponding to the centers of the triangular lattice formation of the core columns 1. Each support column 4 engages its respective core column 1 in a manner preventing the core column from moving away from its center location, e.g., by a spigot and socket joint.

The upper support members 3 are in the form of two rods, each of which is suitably releasably pinned at its lower end to the upper end of its respective core column 1, also to prevent the latter from moving from its center location. It will be appreciated that the rods 3 are similar in number to the support columns 4 and are coaxial with said support columns.

In this embodiment each standpipe 5 extending through the top of the pressure vessel has its axis coaxial with an axis between a group of three adjacent core columns 1 (see FIG. 2) and the diameter of the standpipe is sufficient to include the center axes of these three columns. Thus, the tie rod 3 for each core column 1 of each group is carried by the standpipe closure (not shown) for the respective standpipe and the tie rods 3 for each group of core columns 1 are suitably braced by struts 6. The standpipe closure thus provides a common link member for each group of core columns 1, which, when withdrawn from its standpipe, releases the upper ends of its said group. The released group of columns 1, or a selected one of the group, may then be removed from the reactor, and replaced, through the respective standpipe 5 by a suitable charge/discharge arrangement. As is well known, each column is normally built up from a number of individual blocks which are positively aligned together, e.g., by a spigot and socket arrangement, in which case each column may be withdrawn and replaced in the pressure vessel 2 either as a complete unit or one or more blocks at a time.

The arrangement of the present invention is suitable for use in a recently proposed type of carbon-dioxide cooled, graphite moderator reactor in which at least those graphite core columns containing fuel channels in which the fuel is supported may be withdrawn from the core and renewed at required intervals.

In a typical example of the invention, a 600 MW high temperature helium cooled reactor may comprise 250 columns 1 containing fuel. Each column is about 21 feet high, comprising 2 ft. 6 in. bottom reflector, 16 ft. of active core and 2 ft. 6 in. of top reflector. The column is hexagonal in cross-section, as shown in FIG. 2, being about 20 inches across flats. The blocks of the columns 1 are of isotropic graphite with an operating temperature ranging from 300° C to 850° C. The column pitch which is controlled by the fixed pillars 4 at the bottom and the standpipe closure tie rods 3 at the top is such that there is an initial clearance 7 between adjacent new fuel columns of 0.8 in., which is sufficient over the bulk of the core to allow free withdrawal and replacement of the columns allowing for thermal expansion, build tolerances and bowing due to irradiation. The clearances 7 between the columns at the periphery of the core and the radial reflector are arranged to be 1.5 in. because the damage flux gradients under irradiation conditions which cause bowing of the columns 1 are greatest across the peripheral columns and cause systematic bowing of these columns towards the radial reflector.

We claim:

1. A fluid-cooled nuclear reactor having a solid reactor core comprising a plurality of parallel vertical columns of moderator and fuel material, a pressure vessel surrounding the core, and standpipes penetrating the tip of the pressure vessel to allow insertion and withdrawal of the columns, each standpipe being centered over a group of adjacent columns and being of width sufficient to permit withdrawal of said columns one at a time, a closure member for each standpipe, a lower support member for each column on which the column rests for supporting the weight of the column and locating its lower end relative to the pressure vessel, and an upper support member for each column releasably engaging and locating the upper end of the column relative to the pressure vessel, the upper support members for each group of adjacent columns being linked together and all engaged with the closure member of that standpipe which is associated with the said group of columns so that on removal of that closure member all the columns of the said group are simultaneously released for withdrawal by the simultaneous disengagement of the linked upper support member of the group of columns.

* * * * *